July 14, 1959
A. L. QUINLAN
2,895,083
SAFETY DEVICES FOR ELECTRICAL APPARATUS
Filed Feb. 24, 1955
2 Sheets-Sheet 1
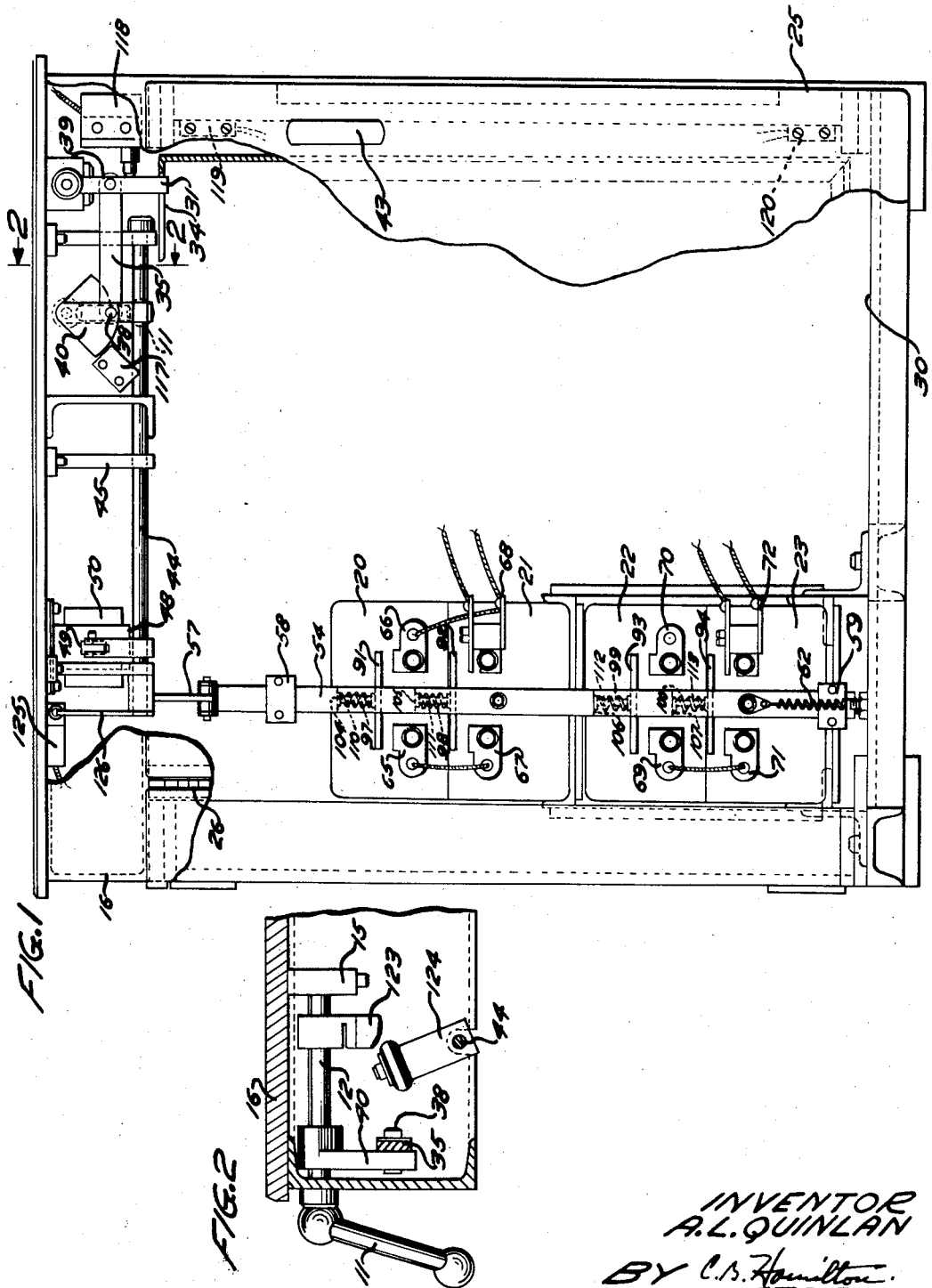
INVENTOR
A.L. QUINLAN
BY C.B. Hamilton
ATTORNEY

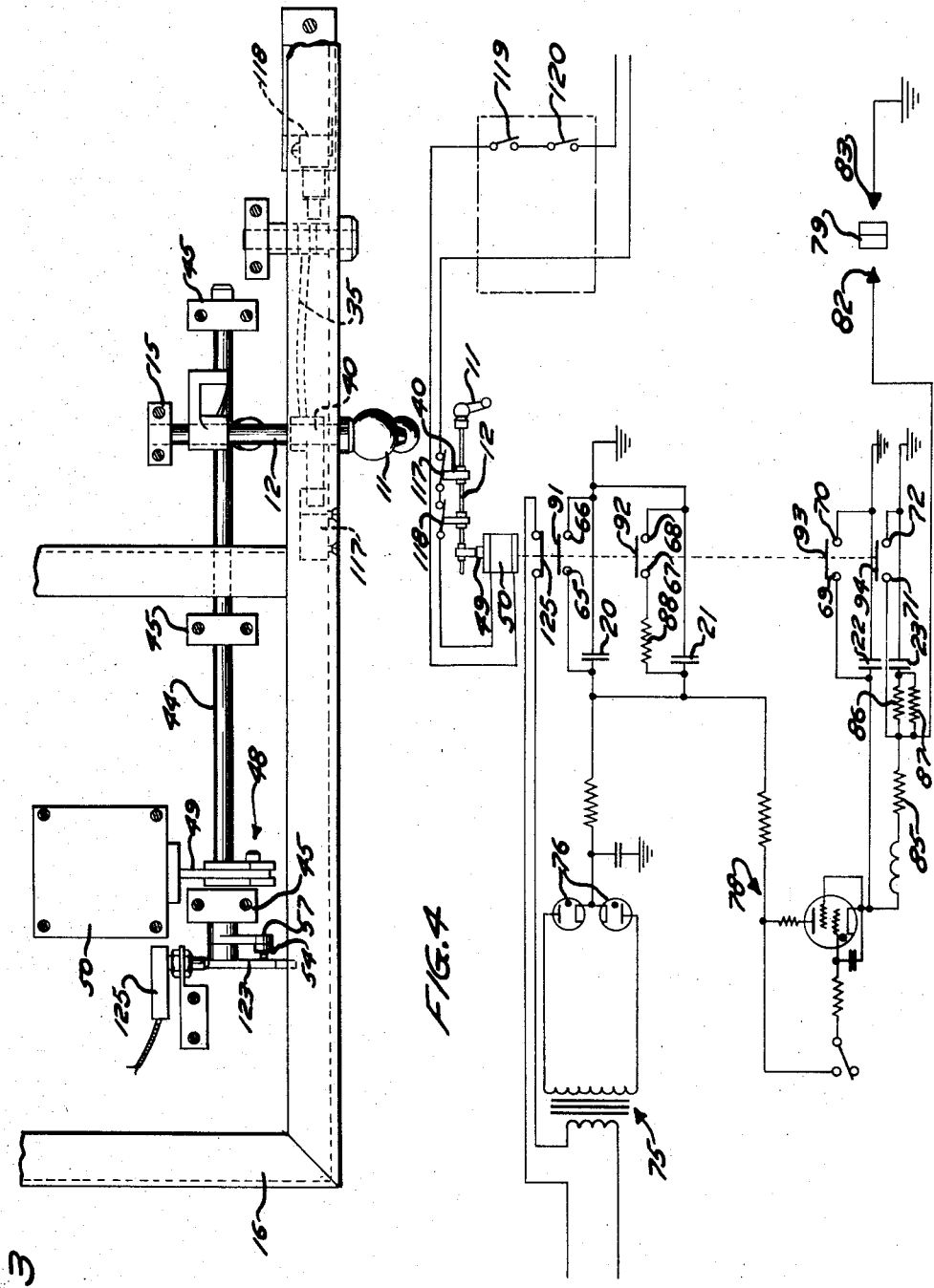

United States Patent Office 2,895,083
Patented July 14, 1959

2,895,083

SAFETY DEVICES FOR ELECTRICAL APPARATUS

Amos L. Quinlan, La Grange, Ill., assignor to Western Electric Company, Incorporated, New York, N.Y., a corporation of New York Application February 24, 1955, Serial No. 490,390

6 Claims. (Cl. 317—9)

This invention relates to safety devices for electrical apparatus and more particularly to door controlled safety devices for discharging capacitors housed in cabinets.

An object of this invention is to provide an improved device for discharging a bank of capacitors mounted in a cabinet when a door in the cabinet is opened.

Another object of this invention is to provide an electrical interlocking means for discharging a bank of capacitors mounted in a cabinet and disconnecting the power supply when a door in the cabinet is opened.

One embodiment of the present invention for discharging a bank of capacitors mounted in a cabinet when a door in the cabinet is opened may include a plurality of resistances, a plurality of conducting bars for connecting the terminals of the capacitors to the resistances to discharge the capacitors through the resistances to ground and for directly short circuiting the capacitors to insure that they are discharged, means for moving the conducting bars into position to discharge the capacitors, a solenoid for holding the bars out of the discharging position, a plurality of switches connected to the solenoid and responsive to the position of the door to de-energize the solenoid when the door is opened whereby the moving means actuates the conducting bars to discharge the capacitors, means actuated by a handle for unlocking the door, and means actuated by the handle for moving the bars to discharge the capacitors if the switches fail to de-energize the solenoid when the door is opened.

Other objects and advantages of the invention will become apparent by reference to the following detailed description thereof and the accompanying drawings illustrating a preferred embodiment of the invention, in which:

Fig. 1 is a fragmentary front elevation of the device with its door closed;

Fig. 2 is a section taken along line 2—2 of Fig. 1 showing the locking handle and actuating mechanism;

Fig. 3 is a partial plan view of Fig. 1 showing the locking handle and actuating mechanism; and Fig. 4 is a circuit diagram of a welding circuit including capacitors and combined with the safety controls of this invention.

Referring now in detail to the drawings there is shown a locking handle 11 secured to a stub shaft 12 pivotally mounted in a bearing 15 and extending through an aperture in a cabinet 16 in which is mounted a bank of charging and welding capacitors 20, 21, 22 and 23. A door 25 is pivoted to the cabinet 16 by a hinge 26 and closes an opening 30 in the cabinet 16, the opening 30 providing access to the capacitors 20–23 when the door 25 is open. A depending locking finger 31 is pivotally mounted on the cabinet 16 (Fig. 1) and is movable into a slot 34 in the door 25 to lock it in a closed position. A link 35 is secured by pins 38 and 39 between the finger 31 and a cam 40 which is secured to the stub shaft 12 whereby the handle 11 may be turned to move the locking finger 31 into or out of the slot 34 in the door 25 to lock or unlock it. The door 25 is provided with a handle 43 to permit an operator to open and close it.

A shaft 44 supported by bearings 45 and positioned below and perpendicular to the stub shaft 12 has a crank portion 48 to which is secured a plunger 49 of a solenoid 50 so that, when the plunger 49 is actuated, the shaft 44 is rotated a predetermined amount.

A depending sliding member 54 is pivotally secured to a lever 57 attached to the shaft 44 whereby clockwise movement thereof raises the sliding member 54 and counter-clockwise movement of the shaft 44 lowers the member 54 (Fig. 2). When the solenoid 50 is energized the plunger 49 is held therein to retain the sliding member 54 in its uppermost position. The member 54 is slidable in guides 58 and 59 which are secured to the cabinet 16. A tension spring 62 secured to the lower end of the member 54 and to the cabinet 16 (Fig. 1) moves the member 54 downward to its lowermost position when the solenoid 50 is de-energized.

The bank of charging and welding capacitors 20–23, which may be connected in a welding circuit such as is shown in Fig. 4, and having features disclosed and claimed in co-pending application Serial No. 462,154, filed October 14, 1954, for "Welding Circuits," by R. F. Schalk, are supported by the cabinet 16, the member 54 passing between projecting terminals 65 and 66, 67 and 68, 69 and 70, and 71 and 72, of the capacitors 20, 21, 22 and 23, respectively. A transformer 75 (Fig. 4) supplies electrical power through rectifying tubes 76 to the charging capacitors 20 and 21 (Fig. 4). The charging capacitors 20 and 21 operate through a charging network 78 to charge the welding capacitors 22 and 23, which are discharged through a pair of electrodes 82 and 83 to weld work pieces 79 positioned between the welding electrodes 82 and 83. Resistances 85, 86, 87 and 88 are connected in the circuit as shown in Fig. 4, the capacitor 22 discharging through the resistance 85 and the capacitor 23 discharging through the resistances 86 and 87 when a welding operation is performed.

The member 54 carries a plurality of horizontal bars 91, 92, 93 and 94 which engage the projecting terminals 65 and 66, 67 and 68, 69 and 70, and 71 and 72, respectively, to connect the capacitors 20–23 to the resistances 85–88 to discharge them when the door 25 is opened. The bars 91, 92, 93 and 94 are slidably mounted on vertical pins 97, 98, 99 and 100 secured in apertures 104, 105, 106 and 107 in the member 54. Compression springs 110, 111, 112 and 113 in the apertures 104–107 urge the bars 91, 92, 93 and 94 to their lowermost positions in the member 54.

The bars 91–94 are spaced on the sliding member 54 whereby the bars 92 and 94 simultaneously engage the terminals 67, 68, 71 and 72 slightly before the bars 91 and 93 engage the terminals 65, 66, 69 and 70, as the sliding member 54 is lowered. When the bars 92 and 94 contact the terminals 67, 68, 71 and 72, the capacitors 20 and 21 are grounded through the resistance 88; the capacitor 22 is grounded through the resistance 85; and the capacitor 23 is grounded through the resistances 86 and 87 (Fig. 4). After the bars 92 and 94 have engaged the terminals 67, 68, 71 and 72, the bars 91 and 93 engage the terminals 65, 66, 69 and 70 to directly short circuit the capacitors 20, 21 and 22 to thus ground them if for some reason they have not been grounded by contact of the bars 92 and 94 with the terminals 67, 68, 71 and 72. The capacitor 23 is not shorted directly, but is discharged through the resistances 86 and 87.

A switch 117 responsive to the position of the cam 40 and a switch 118 responsive to the position of the locking finger 31 (Fig. 1) are connected with interlock switches 119 and 120 to the solenoid 50 to de-energize it and thus ground the capacitors 20–23 when one or more of the switches 117–120 is opened by movement of the locking finger 31 or the cam 40 or by the opening of the door 25.

After the handle 11 is turned slightly, a cam 123 secured to the stub shaft 12 engages an arm 124 secured to the shaft 44 to force it to rotate and lower the sliding member 54 to discharge the capacitors 20–23 in the event that for some reason the switches 117–120 fail to de-energize the solenoid 50 when the handle 11 is first turned.

A switch 125 secured to the cabinet 16 and connected to the transformer 75 (Fig. 4) is responsive to the position of a lever 126 secured to the shaft 44 whereby, when the sliding member 54 is lowered to discharge the capacitors, the lever 126 moves to open the switch 125 to prevent further charging of the capacitors.

In operation the handle 11 is turned clockwise (Fig. 1) to move the finger 31 out of the slot 34 in the door 25 to unlock it. When the handle 11 is first turned the cam 40 and the finger 31 move to open the switches 117 and 118 to de-energize the solenoid 50. When the solenoid 50 is de-energized the tension spring 62 moves the sliding member 54 downward to bring the shorting bars 92 and 94 into contact with the terminals 67, 68, 71 and 72 to discharge the capacitors 20 and 21 through the resistance 88 and the capacitors 22 and 23 through the resistances 85, 86 and 87. Further downward movement of the member 54 moves the bars 91 and 93 into contact with the terminals 65, 66, 69 and 70 to short circuit the capacitors 20, 21 and 22 and discharge them if for some reason they were not discharged when the bars 92 and 94 contacted the terminals 67, 68, 71 and 72.

As the handle 11 is turned further to remove the finger 31 from the slot 34 in the door 25, the cam 123 moves toward the arm 124 secured to the second shaft 44. If for any reason the solenoid 50 is still energized, the cam 123 engages the arm 124 to force the shaft 44 to rotate to lower the sliding member 54 and thus discharge the capacitors 20–23. The cam 123 engages the arm 124 after the cam 40 and the finger 31 have moved a sufficient distance to allow the switches 117 and 118 to open, to thus insure that the sliding member 54 will be lowered to discharge the capacitors 20–23 even if the switches 117 and 118 fail to open for any reason.

After the handle 11 is turned until the locking finger 31 clears the slot 34 the operator grasps the door handle 43 to open the door 25, the capacitors 20–23 being thus completely discharged whereby the operator may safely inspect or repair the apparatus.

When the door 25 is closed the interlock switches 119 and 120 close, and, when the handle 11 is turned to move the locking finger 31 to lock the door 25, the cam 40 and the finger 31 close the switches 117 and 118 to apply a voltage to the solenoid 50, which raises the sliding member 54 and the bars 91–94 to permit further welding operations.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a safety device for a cabinet housing an electrical component and having a closure, means movable into operative position for connecting the component in the cabinet to ground, resilient means on the cabinet normally urging the connecting means into operative position, holding means on the cabinet normally resisting the resilient means to retain the connecting means out of operative position, means on the cabinet for locking the closure to the cabinet, means controlled by the locking means for disabling the holding means for permitting the resilient means to move the connecting means into operative position to ground the component, and additional means on the cabinet and actuated by the locking means for moving the connecting means to ground the component.

2. In a safety device for a cabinet having a closure and housing electrical components which are connected to a power supply, movable support means on the cabinet, a plurality of conductive bars on the support means and movable with said support means into operative position for connecting the components in the cabinet to ground, resilient means on the cabinet normally urging the support means and the bars into operative position, holding means normally resisting the resilient means to retain the support means and the bars out of said operative position, means on the cabinet for locking the closure to the cabinet, means on the cabinet responsive to the position of the support means for disabling the holding means and permitting the resilient means to move the support means and the bars into operative position to ground the components, and means operated by the support means for disrupting the power supply to said components when said support means and said bars are moved into operative position.

3. In a safety device for a cabinet having a closure and housing electrically connected components which are connected to a power supply, movable support means on the base, a plurality of conductive bars carried by the support means into operative position for connecting the components in the cabinet to ground, means on the cabinet for locking the closure to the cabinet, resilient means on the cabinet and attached to the support means for normally urging said support means to carry the bars into operative position, a solenoid having a plunger attached to the support means for normally resisting the resilient means to hold the support means and the bars out of operative position, means for energizing the solenoid, means mounted on the cabinet and controlled by the locking means for deenergizing the solenoid for permitting the resilient means to move the support means and the bars into operative position for grounding the components, means mounted on the cabinet and controlled by the closure for deenergizing the solenoid, and operated by the support means for disconnecting the components from the power supply.

4. In a safety device for a cabinet housing capacitors and having a door, a plurality of conductive bars supported by the cabinet for contacting the terminals of the capacitors to ground them, means attached to the cabinet for urging the bars toward the terminals, holding means for maintaining the bars out of contact with the terminals, means on the cabinet for locking the door, control means mounted on the cabinet and actuated by the locking means for releasing the holding means whereby the urging means moves the bars to contact the terminals to ground the capacitors, and means mounted on the cabinet and operated by the locking means for moving the bars to contact the terminals to ground the capacitors if the control means fails to release the holding means.

5. A safety device for discharging capacitors mounted in a cabinet when a door in the cabinet is opened, comprising a plurality of resistances, a sliding member mounted on the cabinet, a plurality of conductive bars mounted on the sliding member for contacting the terminals of the capacitors to ground them through the resistances, means for urging the sliding members and the bars toward the terminals, a solenoid having a plunger attached to the sliding member for holding the bars out of contact with the terminals, means for energizing the solenoid, means controlled by a handle for locking the door, control means responsive to the position of the locking means for de-energizing the solenoid whereby the urging means moves the sliding member and the bars to ground the capacitors, and means operated by the handle for actuating the sliding member to move the bars into contact with the terminals to ground the capacitors if the control means fails to de-energize the solenoid.

6. A safety device for grounding capacitors mounted in a cabinet when a door in the cabinet is opened, comprising a member slidably mounted on the cabinet between a plurality of projecting terminals of the capacitors, a plurality of resistances, a plurality of conductive bars mounted on the member for contacting the terminals to connect the capacitors to the resistances to discharge them through said resistances and to directly short circuit them if they fail to discharge through the resistances, a handle secured to a stub shaft mounted on the cabinet, a finger operated by the handle for engaging the door to lock it, a shaft mounted on the cabinet, a solenoid having a plunger secured to the shaft to rotate it a predetermined amount, means for securing the member to the shaft whereby said member is actuated when the shaft is rotated, a spring secured to the member and the cabinet for urging the member and the bars toward the terminals to discharge the capacitors, means for energizing the solenoid to hold the bars out of contact with the terminals, a switch responsive to the position of the finger for de-energizing the solenoid whereby the spring moves the member and the bars to discharge the capacitors, an arm secured to the shaft, a cam secured to the stub shaft to engage the arm to force the shaft to rotate and move the member and the bars whereby the bars engage the terminals and discharge the capacitors if the switches fail to de-energize the solenoid, means for charging the capacitors, and means for rendering inoperative the charging means when the door is opened.

References Cited in the file of this patent

UNITED STATES PATENTS

| | | |
|---|---|---|
| 1,907,542 | Hodtum | May 9, 1933 |
| 2,412,293 | Schymik | Dec. 10, 1946 |

FOREIGN PATENTS

| | | |
|---|---|---|
| 389,916 | Great Britain | Mar. 30, 1933 |